United States Patent [19]

Woltanski

[11] Patent Number: 4,719,951

[45] Date of Patent: Jan. 19, 1988

[54] COMBINATION DRILL PRESS, ROUTER AND SHAPER TABLE, AND METHODS OF CONSTRUCTING AND UTILIZING SAME

[76] Inventor: Joseph W. Woltanski, 28164 Hendrie, Mt. Clemens, Mich. 48045

[21] Appl. No.: 827,429

[22] Filed: Feb. 10, 1986

[51] Int. Cl.⁴ .................. B27B 31/00; B27C 1/12
[52] U.S. Cl. .................. 144/253 J; 83/438; 144/253 R; 144/286 R
[58] Field of Search ............. 83/438, 574; 144/286 R, 144/253 R, 253 H, 253 J

[56] References Cited

U.S. PATENT DOCUMENTS

| | | | |
|---|---|---|---|
| 727,337 | 5/1903 | Forster | 144/253 J |
| 1,947,885 | 2/1934 | Tautz | 144/253 J |
| 2,104,158 | 1/1938 | Hedgpeth | 144/253 J |
| 4,562,670 | 1/1986 | Maier et al. | 144/253 J |

Primary Examiner—W. D. Bray
Attorney, Agent, or Firm—Irving M. Weiner; Joseph P. Carrier; Pamela S. Burt

[57] ABSTRACT

An apparatus regarding a wood workpiece or the like when being routered or cut on a drill press or like machine, comprising, in combination a substantially flat member, first means regarding routering or cutting of the workpiece operably attached in a predetermined manner to said flat member, and second means for attaching said flat member to said drill press or other like machine.

13 Claims, 4 Drawing Figures

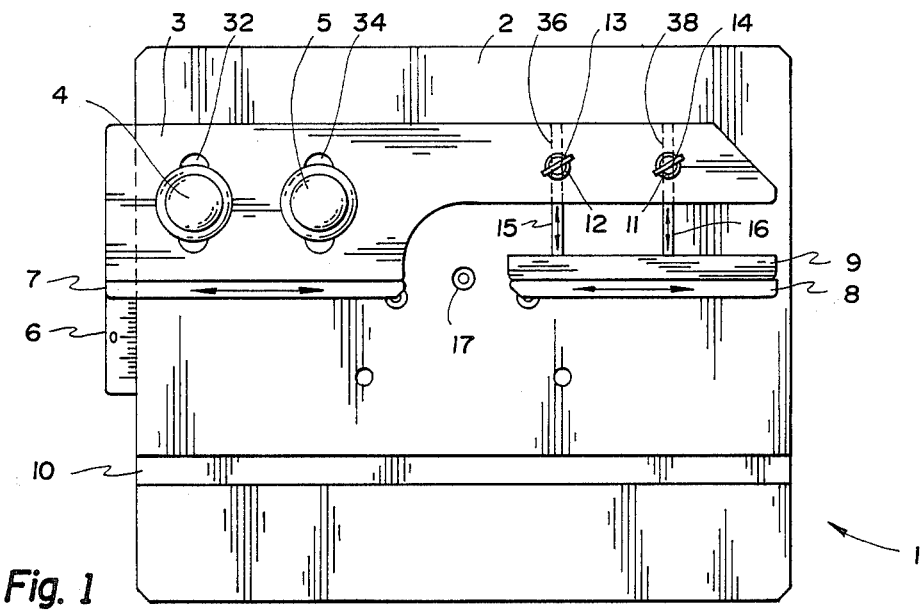
Fig. 1
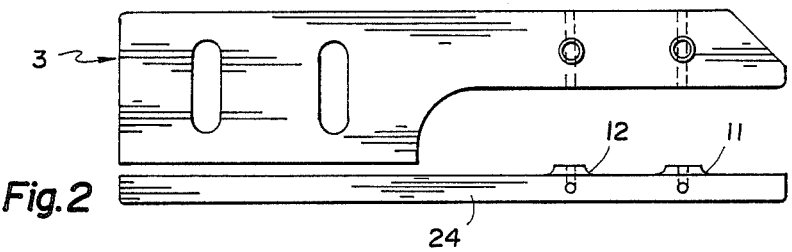
Fig. 2
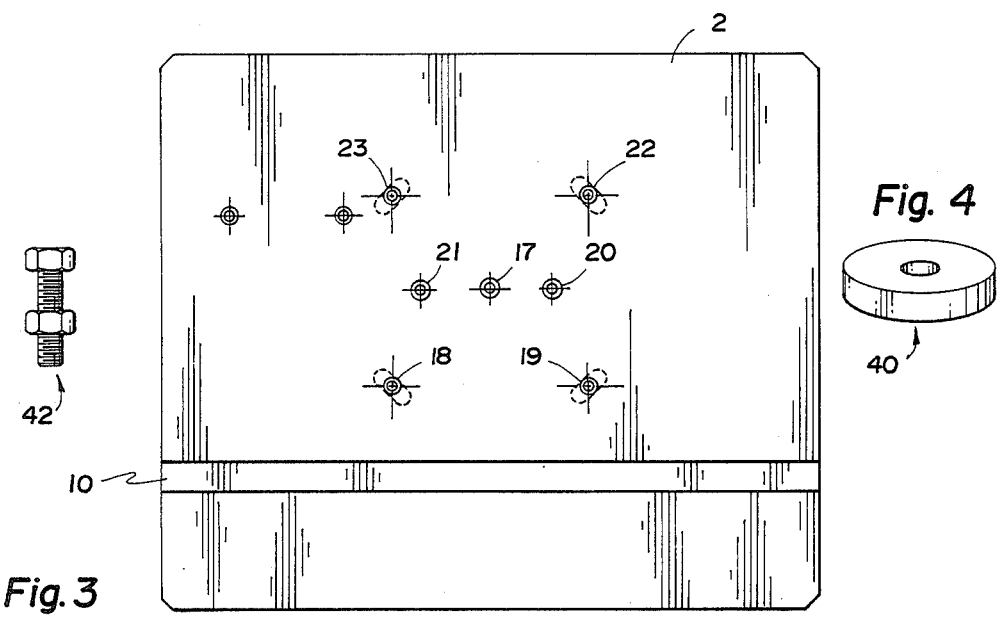
Fig. 3
Fig. 4

COMBINATION DRILL PRESS, ROUTER AND SHAPER TABLE, AND METHODS OF CONSTRUCTING AND UTILIZING SAME

BACKGROUND OF THE INVENTION

1. Field of the Invention

The present invention relates generally to the field of wood working and routering. More specifically, it discloses an apparatus for assisting in the manipulation of a workpiece so that it may be routered, cut, sanded, pin routered, or free routered.

A router is a rather bulky piece of equipment requiring careful manipulation so that a workpiece is not ruined by a wrong cut. Furthermore, without a means of guiding a router or like piece of equipment, it is difficult if not impossible to achieve many desired goals in the finished product.

2. Description of Relevant Art

Heretofore guides have been proposed and disclosed for directing the operations of routering, milling, cutting, sanding, free routering, and pin routering. One such unit which assists in the task of routering was disclosed in U.S. Pat. No. 4,044,805 in which a new and improved router guide fence and associated sub-base were shown, and said fence had a straight edge of considerable length interrupted by a recess of about the same size as the largest router bit to be used. This fence, however, has the disadvantage of being able to do only one job, that being routering, and does not lend itself to easily planing a straight edge as, e.g., a piece of wood being worked as it would pass by the recess for the router bit would have different dimensions on one side of the router bit than the other after having been routed.

There have also been disclosed devices for holding a workpiece while it is being routed or worked with other similar equipment. One such device was disclosed in U.S. Pat. No. 4,480,364 which showed an apparatus for holding a workpiece having alignment pins in an aligned position on a work table. This device, however, has the disadvantage of not being combined with, for example, a router fence, a zeroing gauge, and/or a miter. All of which are useful to have in close proximity to a workpiece.

Applicant's apparatus seeks to provide not only a workpiece holding alignment device, and a new and improved router fence, but also a work area having a true guide router fence attached to said work area and said apparatus will be adaptable to four or five different distinct operations. Additionally, said apparatus will have removable attachments allowing it to be used for different types of jobs, for example, pin routering, routering, cutting, sanding, and free form routering.

SUMMARY OF THE INVENTION

The present invention comprises a true guide router fence which is removably and adjustably attached to a base which can be fixed to the work area of a drill press or the like. The true guide router fence has attached at one end a zeroing scale which zeros on the center of the drill press chuck or the like. Also, the true guide router fence has a secondary fence at one end which is adjustably connected to provide more perfect planing, and both fences have slidingly adjustable faces thereon to accommodate various sized routers, shapers, and drum sanders.

It is an object of this invention to provide a relatively inexpensive surface adaptable to a variety of woodworking needs.

It is another object of the invention to provide an apparatus with many of the usual tools of woodworking combined into one.

BRIEF DESCRIPTION OF THE DRAWINGS

FIG. 1 is a top plan view of the invention showing the true guide router fence spanning substantially the width of the flat member to which it is attached and having adjacent to one side of it a zeroing gauge. Furthermore, it shows the second router fence attached via rods to the true guide router fence.

FIG. 2 shows substantially the same true guide router fence as in FIG. 1 except it has a different face associated with it which is substantially the same length as the true guide router fence and has enlarged bosses to keep the inserts from being pulled out.

FIG. 3 is a top plan view of the flat member as it may be used when performing free form routering or other forms of woodwork.

FIG. 4 is a perspective view of an accessory workpiece roller according to the present invention.

DETAILED DESCRIPTION OF PREFERRED EMBODIMENT

FIG. 1 as noted above shows the invention 1 as it may be used for routering and planing. As can be seen it consists of flat member 2 which may be some form of a wood or other like substance having attached thereon to its top surface true guide router fence 3. The true guide router fence 3 is securely fastened to the top of flat member 2 by fastener knobs 4 and 5. The true guide router fence 3 may be slidingly adjusted to the surface of the flat member 2 and to accommodate the router not shown by loosening fastening knobs 4 and 5.

As can be seen a zeroing gauge 6 is slidingly attached to one end of true guide router fence 3 so that the workpiece may be aligned as desired with respect to centering post 17. The centering post 17 is removable as desired, but may be left so as to serve as an additional guide. It should be further noted that true guide router fence 3 has on its front surface a face 7, attached to fence 3 by conventional means. Face 7 is slidingly adjustable as indicated by the arrow thereon so as to be able to accommodate the largest sized router bit to be used. Furthermore, a second router fence 9 is interconnected with true guide router fence 3 by slidingly adjustable posts 15 and 16 has a slidingly adjustable face 8, attached to fence 9 by conventional means, so as to further increase the ability of the invention 1 to accommodate various sized routers. Adjustable posts 15 and 16 are slidingly received into fence 3 by conventional means indicated by broken lines 36 and 38. Slidingly adjustable posts 15 and 16 are secured to true guide router fence 3 by the tightening of wing nuts 13 and 14. There is additionally provided slidable miter gauge slot 10 which slidably receives a slidable miter gauge (not shown) to assist in feeding a workpiece by the router.

Second router fence 9 further assists in the operation of planing by having the advantageous connection to true guide router fence 3 via the aforementioned sliding posts 15 and 16. These enable the second fence 9 to be adjusted to accommodate for the amount planed by the router. The workpiece is fed along face 7 toward the router which is centered on center post 17. As the workpiece passes by the router and is planed, the adjusted position of second router fence 9 compensates for the cut allowing the planed piece to be guided away from the router along adjusted fence 9.

By way of illustration, FIG. 2 shows the true guide router fence 3 unattached to the flat member 2 without face 7 on it. It further discloses a face 24 having substantially the same length as the true guide router fence. Face 24 lends itself to certain forms of woodworking such as routering and other operations. Additionally, face 24 illustrates threaded inserts 11 and 12 which receive and securely hold wing nuts 13 and 14 respectively. Also, as can be seen there are two substantially elliptical openings 32 and 34 provided in true guide router fence 3 for accommodating fastener knobs 4 and 5. In the other end of true guide router fence 3 are provided two relatively small circular apertures for receiving wing nuts 13 and 14.

FIG. 3 shows another form of the invention 1 wherein it may be utilized in a variety of operations, e.g., pin routering, routering, cutting, sanding, and free form routering. These operations while not illustrated in FIG. 3, may be accomplished by firmly attaching flat member 2 to a work station, not shown, by utilizing conventional fastening means, generally indicated by 42 through one or all of apertures 18, 19, 22 and 23. Posts 17, 20, and 21 which imbed themselves in apertures provided in flat member 2 are adaptable for having attachments placed thereon, e.g., rollers for running a workpiece by, generally indicated by 40 in FIG. 4, sanding wheels, forms, etc.

It should be understood that the above detailed description is only that of the preferred embodiment of invention 1. It should be further understood that no disclaimer is intended of other embodiments of invention 1 or improvements thereto.

A better understanding of invention 1 will come from a thorough study of the appended claims.

I claim:

1. An apparatus for guiding a wood workpiece or the like when being routered or cut on a drill press or like machine, comprising, in combination:
   a substantially flat member;
   first means for guiding the workpiece operably attached in a predetermined manner to said flat member;
   second means for attaching said flat member to said drill press or other like machine;
   said second means including fasteners which pass through slots in said flat member;
   a slidable miter gauge residing in a slot in the top surface of said flat member;
   a plurality of posts;
   a plurality of apertures in said flat member;
   said plurality of posts residing in said plurality of apertures for receiving attachments including rollers by which said workpiece is guided;
   said first means including a primary fence and a secondary fence;
   said primary fence spanning substantially the length of said flat member; and
   said primary fence comprising:
   a slidable first face on the side of said primary fence nearest the workpiece.

2. An apparatus for guiding a wood workpiece or the like when being routered or cut on a drill press or like machine, comprising, in combination:
   a substantially flat member;
   first means for guiding the workpiece operably attached in a predetermined manner to said flat member;
   second means for attaching said flat member to said drill press or other like machine;
   said second means including fasteners which pass through slots in said flat member;
   said first means including a primary fence and a secondary fence;
   said primary fence spanning substantially the length of said flat members; and
   said primary fence further comprising:
   a slidable first face on the side of said primary fence nearest the workpiece.

3. The apparatus of claim 2, wherein:
   said secondary fence is adjustably connected to said primary fence;
   said secondary fence further comprises:
   a slidingly adjustable second face on the side of said second fence nearest the workpiece.

4. An apparatus for guiding a wood workpiece or the like when being routered or cut on a drill press or like machine, comprising, in combination:
   a substantially flat member;
   first means for guiding the workpiece operably attached in a predetermined manner to said flat member; and
   second means for attaching said flat member to said drill press or other like machine;
   said second means including fasteners which pass through slots in said flat member.

5. An apparatus for guiding a wood workpiece or the like when being routered or cut on a drill press or like machine, comprising, in combination:
   a substantially flat member;
   first means for guiding the workpiece operably attached in a predetermined manner to said flat member;
   second means for attaching said flat member to said drill press or other like machine;
   said second means including fasteners which pass through slots in said flat member;
   a removable center post residing in a threaded aperture in the top surface of said flat member;
   a slidable miter gauge residing in a slot in the top surface of said flat member; and
   a zeroing scale attached to said primary fence.

6. The apparatus of claim 5, further including:
   a plurality of posts; and
   a plurality of apertures in said flat member;
   said plurality of posts residing in said plurality of apertures for receiving a variety of attachments.

7. An apparatus for guiding a workpiece, comprising:
   a substantially flat member having provided therein a plurality of apertures at a pre-determined position;
   a first means for guiding said workpiece operably connected to said substantially flat member;
   a means for adjusting where the workpiece will be worked on operably attached to said substantially flat member; and
   a second means for guiding said workpiece operably engaged with said first means, whereby once the workpiece has been adjusted it is moved adjacent to said first and second guide means across the surface of said substantially flat member.

8. The apparatus of claim 7, further comprising:
   a plurality of posts adapted to said plurality of apertures in said substantially flat member; and third means for securing said substantially flat member from being moved.

9. The apparatus of claim 8, wherein:
said first means includes a substantially key-shaped router fence removably attached to said substantially flat member; and
said key-shaped router fence has thereon a face which is adjustably attached thereto.

10. The apparatus of claim 9, wherein:
said second means for guiding said workpiece includes a second fence smaller than said key-shaped fence; and
said second fence has thereon a face no longer than it adjustably attached thereto.

11. The apparatus of claim 10, wherein:
said means for centering said workpiece is one of said plurality of posts and fits into one of said plurality of apertures in said substantially flat member and is located an equal distance between said face on said key-shaped router fence and said face on said second fence.

12. The apparatus of claim 11 further comprising:
a zeroing scale operably attached to said substantially flat member;
a miter gauge operably attached to said substantially flat member; and
a plurality of guide knobs adapted to operably attach to said plurality of posts.

13. The apparatus of claim 12, wherein:
said operable engagement of said second means for guiding said workpiece to said first means is accomplished by slidingly adjustable posts attached therebetween.

* * * * *

UNITED STATES PATENT AND TRADEMARK OFFICE
CERTIFICATE OF CORRECTION

PATENT NO. : 4,719,951

DATED : January 19, 1988

INVENTOR(S) : Joseph W. Woltanski

It is certified that error appears in the above-identified patent and that said Letters Patent is hereby corrected as shown below:

Column 4, line 11, change "members" to --member--.

Signed and Sealed this

Twelfth Day of July, 1988

Attest:

DONALD J. QUIGG

Attesting Officer

Commissioner of Patents and Trademarks